(12) United States Patent
Thompson et al.

(10) Patent No.: US 6,752,443 B1
(45) Date of Patent: Jun. 22, 2004

(54) LOAD FLOOR SYSTEM

(75) Inventors: Joseph M. Thompson, Holland, MI (US); Rick A. Anderson, Grand Haven, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 96 days.

(21) Appl. No.: 10/009,234
(22) PCT Filed: Jun. 7, 2000
(86) PCT No.: PCT/US00/40129
§ 371 (c)(1),
(2), (4) Date: Apr. 12, 2002
(87) PCT Pub. No.: WO01/15931
PCT Pub. Date: Mar. 8, 2001

Related U.S. Application Data
(60) Provisional application No. 60/137,996, filed on Jun. 7, 1999.

(51) Int. Cl.[7] .............................................. B62D 33/04
(52) U.S. Cl. ................. 296/24.1; 296/37.15; 297/188.1
(58) Field of Search ............................ 296/24.1, 37.8, 296/37.14, 37.15; 224/275; 297/188.08, 188.09, 188.1

(56) References Cited

U.S. PATENT DOCUMENTS

| | | | |
|---|---|---|---|
| 2,465,770 A | * 3/1949 | Volsk ....................... | 296/37.15 |
| 4,256,340 A | * 3/1981 | Dunchock ................ | 296/37.15 |
| 4,519,646 A | 5/1985 | Leitermann et al. | |
| 5,039,155 A | * 8/1991 | Suman et al. ............ | 296/37.15 |
| 5,597,201 A | * 1/1997 | Hinze ...................... | 297/188.1 |
| 5,622,404 A | * 4/1997 | Menne ..................... | 297/188.1 |
| 5,902,009 A | * 5/1999 | Singh et al. ............. | 296/37.15 |
| 5,957,521 A | * 9/1999 | Schlachter ............... | 296/37.15 |
| 6,082,802 A | * 7/2000 | Vigilante, Jr. ........... | 296/37.15 |
| 6,106,044 A | * 8/2000 | Schlachter ............... | 296/37.15 |
| 6,386,612 B2 | * 5/2002 | Hofmann et al. ........ | 296/37.15 |
| 6,419,313 B1 | * 7/2002 | Newman ................. | 296/37.15 |
| 2002/0005649 A1 | * 1/2002 | Hofmann et al. ........ | 296/37.15 |

FOREIGN PATENT DOCUMENTS

| | | |
|---|---|---|
| GB | 2323820 | 10/1998 |
| JP | 07232581 | 9/1995 |
| JP | 09104271 | 4/1997 |

* cited by examiner

*Primary Examiner*—Lori L. Coletta
(74) *Attorney, Agent, or Firm*—Foley & Lardner LLP

(57) ABSTRACT

A load floor system (10) for a vehicle with a seat assembly, a structural member under the seat assembly, and a floor space adjacent the seat assembly. The load floor system (10) includes a retractable panel coupled to the structural member, a first link coupled to the retractable panel, and a second link coupled to the retractable panel (14). The retractable panel (14), the first link, and the second link cooperate as a portion of a four-bar mechanism to translate the retractable panel from a retracted position under the seat assembly to an extended position over the floor space thereby forming a load floor (38).

20 Claims, 9 Drawing Sheets

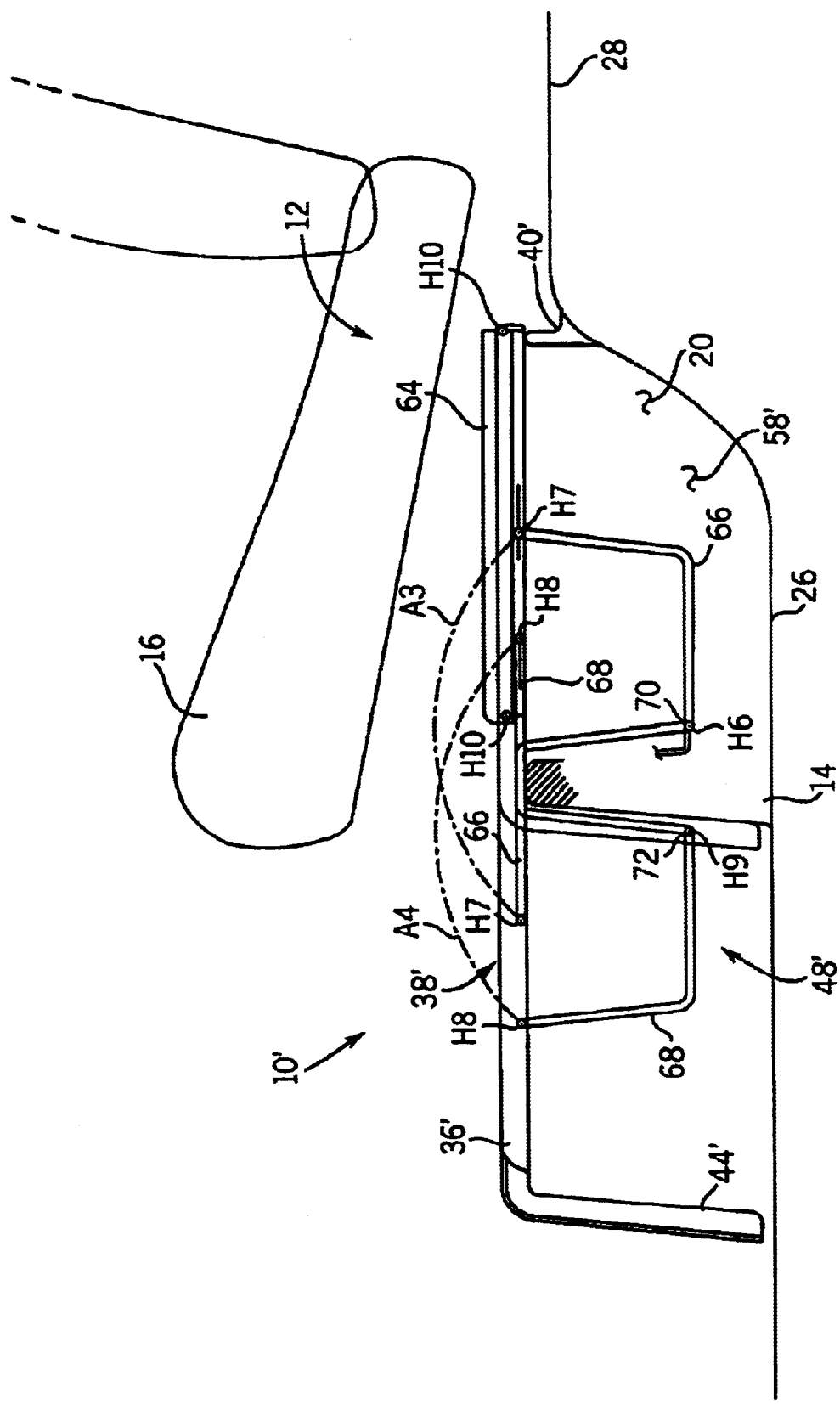

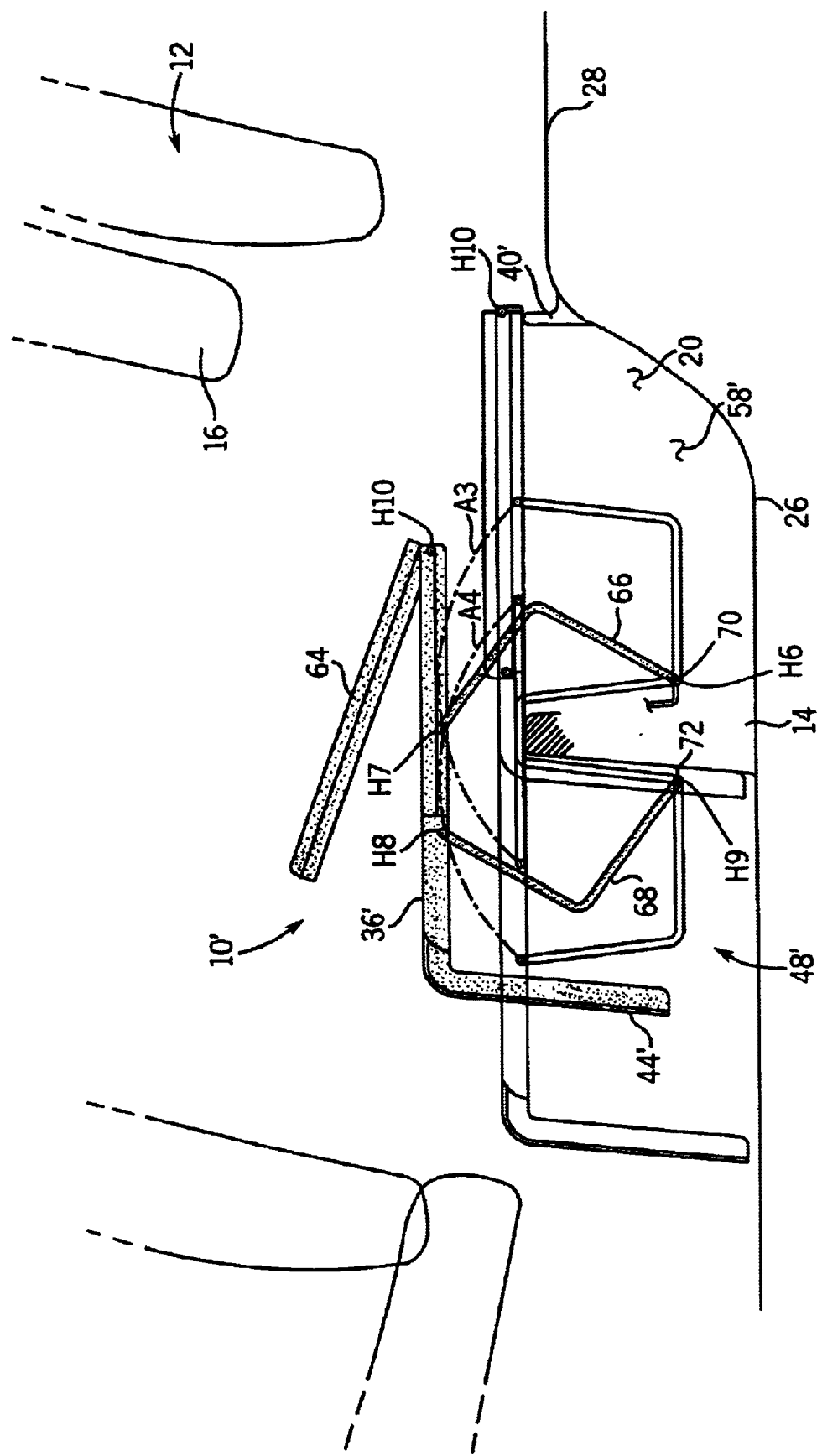

LOAD FLOOR SYSTEM

TECHNICAL FIELD OF THE INVENTION

This invention generally relates to load floor systems. More specifically, this invention relates to load floor systems for a vehicle with a seat assembly, a structural member under the seat assembly, and a floor space adjacent the assembly.

BACKGROUND

One of the recent innovations associated with pickup truck design is the development of the extended cab with a second row of forward-facing rear seats. Unlike the so-called cab or crew pickup truck designs with four full doors, these extended cab pickup trucks have half doors that swing opposite the front doors and a slightly smaller interior space.

One of the problems associated with placing a second row of seats in an extended cab pickup truck is that it reduces the storage capacity of the bed of the pickup truck if the overall vehicle length remain the same. That is, the presence of the rear seat interferes with the ability to store objects such as toolboxes, machine parts and other cargo that require relatively large flat surfaces for storage. While effort has been placed into designing seat that could be removed or placed in a retracted position to thereby increase the usable space within the extended cab pickup truck, the resulting area is relatively small and the surface upon which cargo could be placed is generally non-planar and therefore hinders the storage of relatively large items.

Accordingly, it is desirable to have a load floor system that could be used to accommodate relatively large amount of cargo when the rear seats are not being used. At the same time, it would be desirable to have a load floor system that does not interfere with the occupants of the rear seats when the rear seats are being used.

SUMMARY OF THE INVENTION

Accordingly, this invention provides for a load floor system that overcomes the problems and disadvantages of the conventional techniques in the art. The invention also provides for a load floor system for a vehicle with a seat assembly, a structural member under the seat assembly, and a floor space adjacent the seat assembly.

Briefly, the invention includes a retractable panel coupled to the structural member, a first link coupled to the retractable panel, and a second link coupled to the retractable panel. The retractable panel, the first link, and the second link cooperate as a portion of a four-bar mechanism to translate the retractable panel from a retracted position under the seat assembly to an extended position over the floor space thereby forming a load floor.

BRIEF DESCRIPTION OF THE DRAWINGS

Further features and advantage of the invention will become apparent from the following discussion and accompanying drawings in which:

FIG. 7 is a side view of the load floor system of FIG. 6, shown in both a retracted position and the extended position;

FIG. 8 is a side view of the load floor system of FIGS. 6 and 7, shown in both the retracted position and the extended position, and shown again with a darker color during a transition between the retracted position and the extended position;

DETAILED DESCRIPTION OF THE PREFERRED EMBODIMENTS

The following description of the preferred embodiments are merely exemplary in nature, and are in no way intended to limit the invention or its application or uses.

Referring to FIGS. 1–5, a load floor system 10 (not visible in FIG. 1, see FIGS. 3–5) according to the preferred embodiment of the present invention may be installed in the rear portion of an extended-cab pickup truck under a set of forward-facing storable seats 12 with a "60/40 split." The load floor system 10, of course, can be used in other environments, such as under side-facing jump seats of pickup trucks, under removable or retractable seats of a station wagon, sport utility vehicle or van, or in any other transporter with storable seats. The term "storable seat" includes seat assemblies that have a retractable or removable seat cushion. The term "60/40 split" refers to a common seating assembly that is split transversely in two sections, with a "sixty-percent section" for one or two passengers, and a "forty-percent section" for one passenger. Seating assemblies with a "60/40 split" allow one section to be used as a seat, and another to be stored. The load floor system 10 of the present invention can also be used under other seating assemblies, such as bench seats and so-called bucket seats. The system 10, however, is optimized as a two-section unit with a "60/40 split" installed under the set of forward-facing storable seats 12 with a corresponding "60/40 split." Accordingly, these storable seats 12 will provide the background environment in the following description. Further, since the "sixty-percent section" of the load floor system 10 is nearly identical to the "forty-percent section", only the "forty-percent section" will be discussed.

Figure 1:
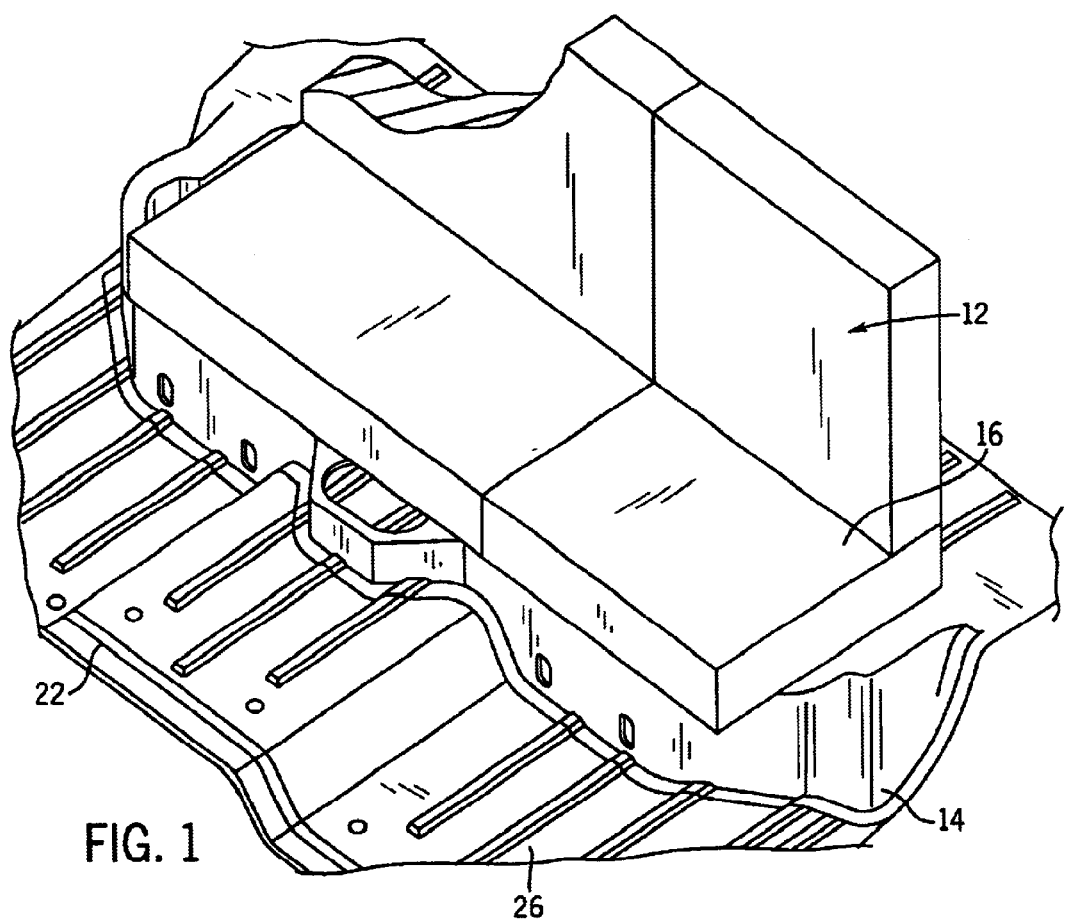
FIG. 1 is a schematic perspective view of the interior of a vehicle having a vehicle seat, which may be disposed over a load floor system in a retracted position.
Figure 2:
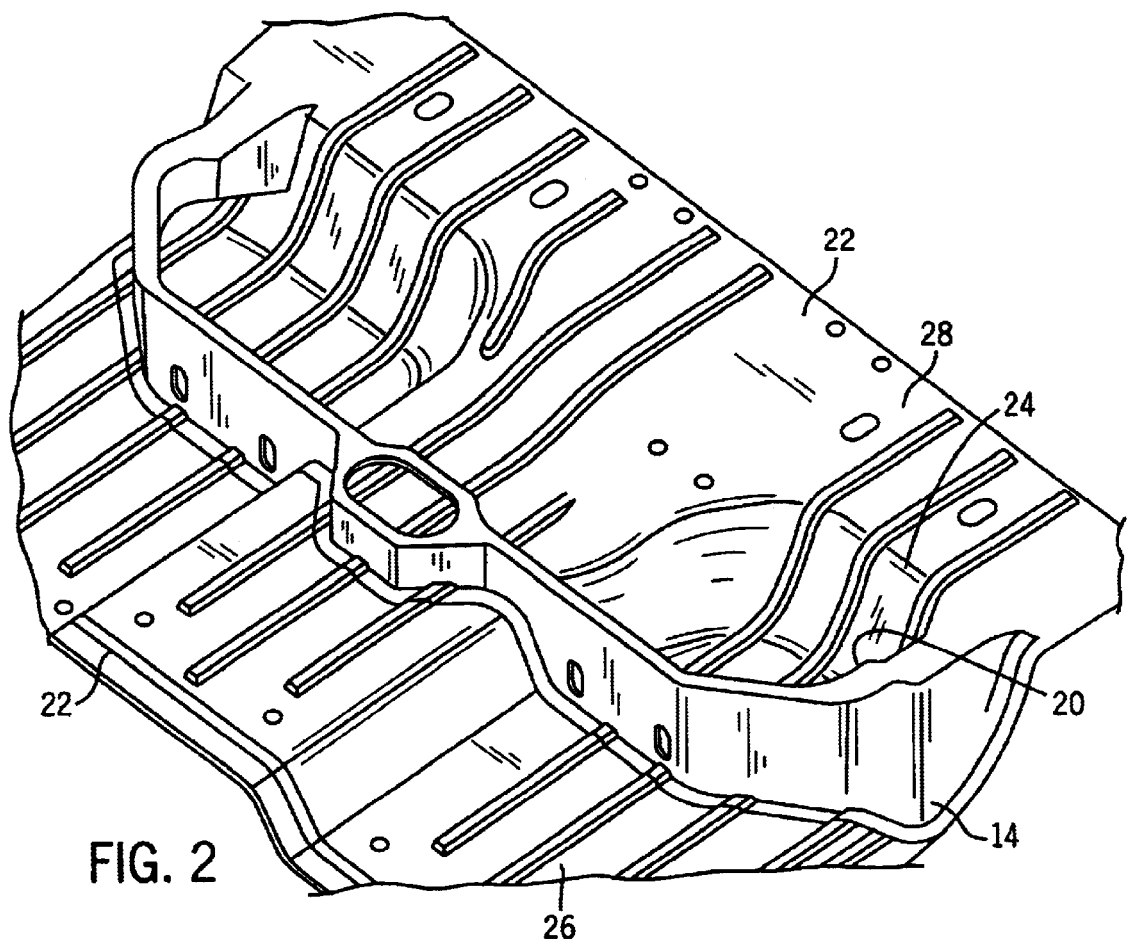
FIG. 2 is a perspective view of the floor pan with a set of storable seats in a stored position.

The load floor system 10 may be used with a structural member 14 located under the storable seat cushion 16 near a front portion 18 (see FIG. 4) of the storable seat cushion 16. As shown in FIG. 2, the structural member 14 encloses two sides of a space or cavity 20, which is made accessible through the load floor system 10. The cavity 20 is further bound by a power train tunnel 22, by a so-called "waterfall"

24 between a lowered floor pan 26 and a raised floor pan 28, on the bottom by the lowered floor pan 26, and on the top by the storable seat cushion 16.

Figure 3:
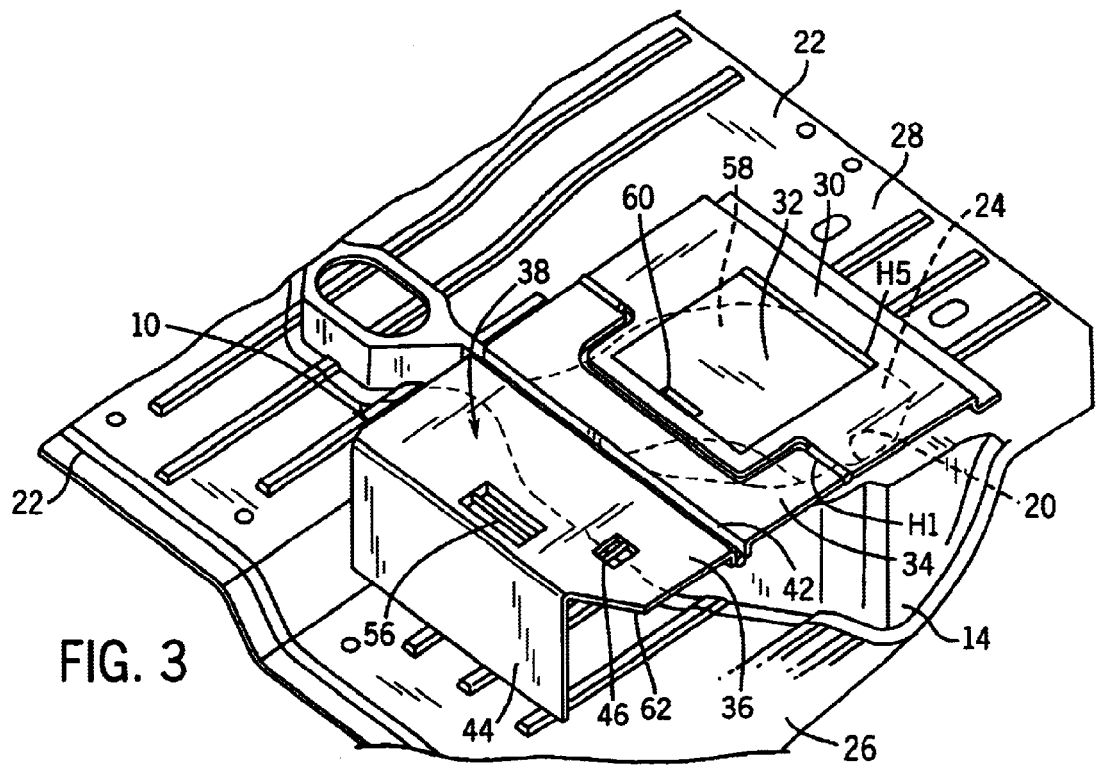
FIG. 3 is a perspective view of the load floor system according to the preferred embodiment of the present invention, shown in an extended position.

As shown in FIG. 3, the load floor system 10 of the preferred embodiment of the present invention includes a secondary panel 30, an access panel 32, an upper link 34, and a retractable panel 36. The load floor system 10 is movable between a retracted position that does not encroach on the leg area of the vehicle (shown in FIG. 1), and an extended position that provides a load floor 38 and that allows access to the cavity 20 (shown in FIG. 3).

In the retracted position, the retractable panel 36 abuts the structural member 14 and neatly tucks under the storable seat cushion 16 on the upper link 34. The load floor system 10 is nearly hidden in this position and does not encroach on the leg area or floor space of the vehicle.

Figure 4:
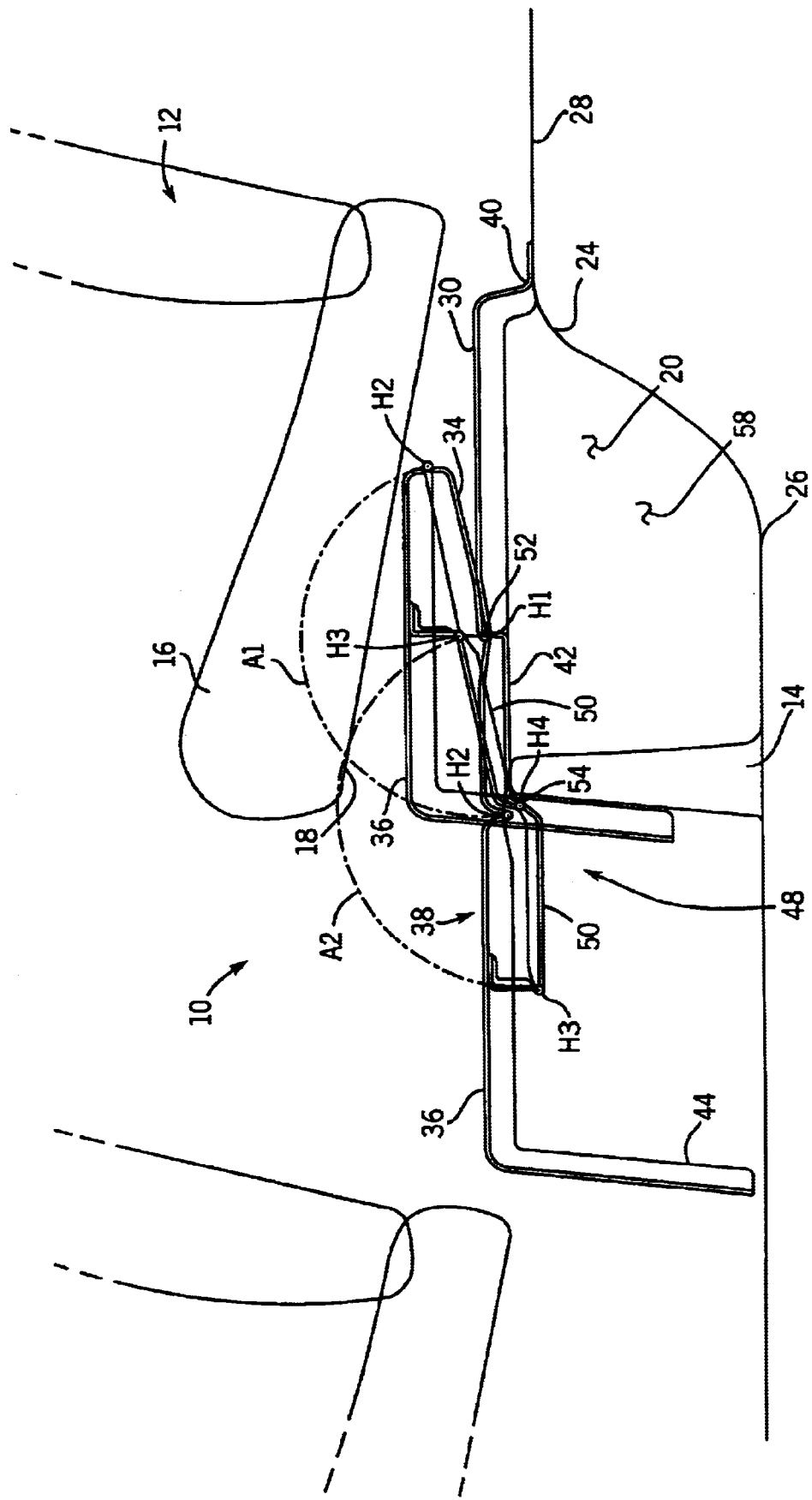
FIG. 4 is a side view of the load floor system of FIG. 3, shown in both the retracted position and the extended position.
Figure 5:
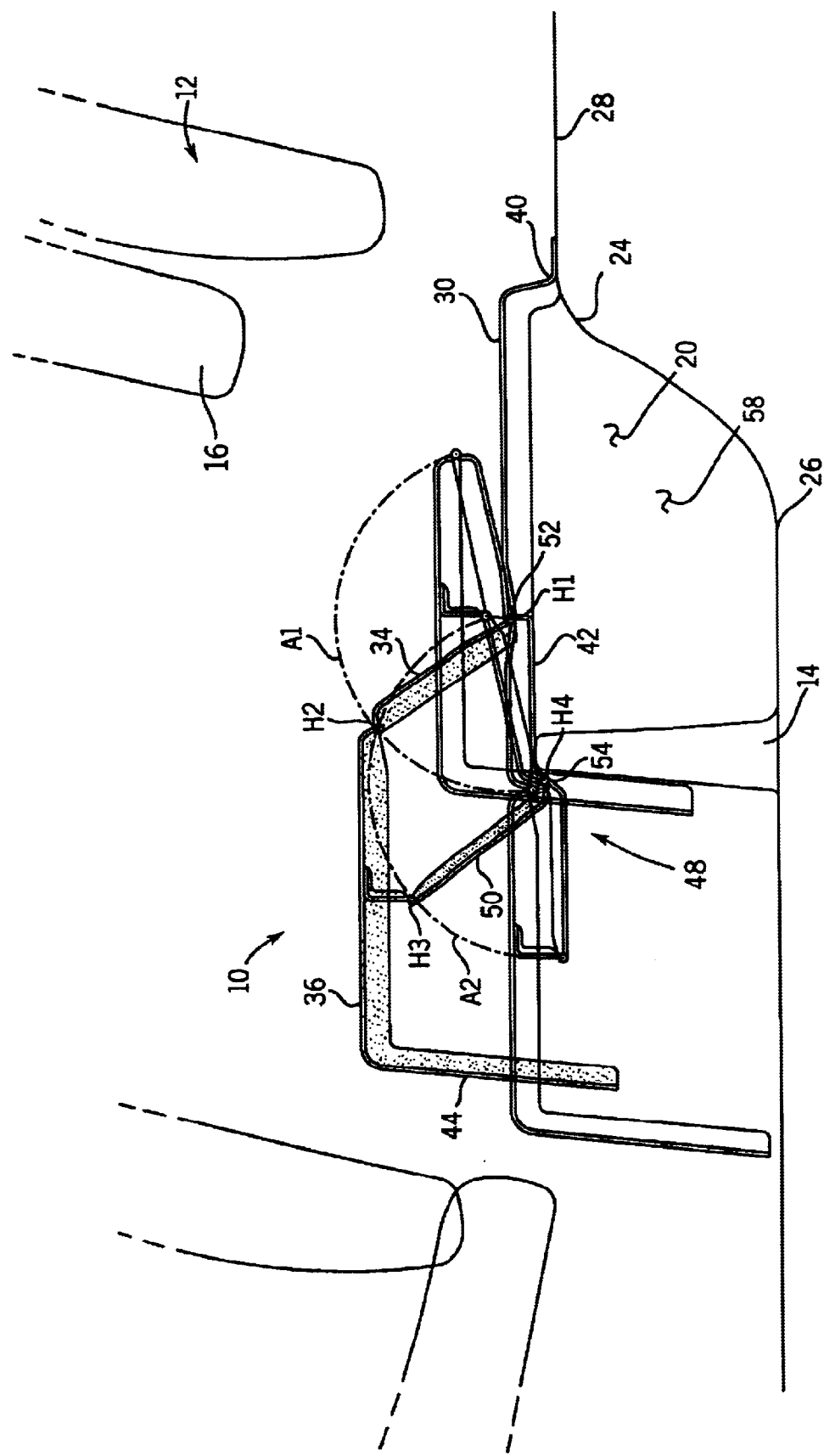
FIG. 5 is a side view of the load floor system of FIGS. 3 and 4, shown in both the retracted position and the extended position, and shown again with a darker color during a transition between the retracted position and the extended position.

In the extended position, the secondary panel 30, the access panel 32, the upper link 34, and the retractable panel 36 all cooperate to form the load floor 38, as best shown in FIG. 4. The second panel 30 is supported by a structural bracket 40 at one end and by the structural member 14 at the other end. Between the structural bracket 40 and the structural member 14, the secondary panel 30 forms a recessed portion 42 that accommodates and supports the upper link 34, as detailed below. The retractable panel 36 is supported by the connection to the upper link 34 at one end and by a leg panel 44 attached to the retractable panel 36 at the other end. The load floor 38 provides a generally flat surface to secure objects such as toolboxes, machine parts, or other cargo. The load floor 38 may include a tie-down 46 or other devices, such as hooks, clamps, or a hook and loop type fastener, such as VELCRO® strips, which function to secure objects to the load floor 38:

As best shown in FIG. 5, the load floor system 10 incorporates a four-bar mechanism 48 to advance from the retracted position to the extended position. The four-bar mechanism 48 includes (1) the upper link 34, later referenced as a "first link", (2) the retractable panel 36, (3) and a lower link 50, later referenced as a "second link". The secondary panel 30 cooperates as the fourth link of the four-bar mechanism 48 between two fixed points 52 and 54. A hinge H1 pivots the upper link 34 to the secondary panel 30; a hinge H2 pivots the upper link 34 to the retractable panel 36; a hinge H3 pivots the retractable panel 36 to the lower link 50; and hinge H4 pivots the lower link 50 to the structural member 14. The hinges H1 and H4 are fixed points and are not displaced during the transition from the retracted position to the extended position. The hinges H2 and H3 are movable points and are displaced through arcs A1 and A2, respectively, during the transition. The hinges H2 and H3 are located in a vertical position relative to the upper link 34 such that the secondary panel 30, the upper link 34, and the retractable panel 36 form the generally flat surface of the load floor 38. The load floor system 10 may include a handle 56 to facilitate the transition of the load floor system 10 between the retracted position and the extended position. The handle 56 is recessed into the surface of the retraceable panel 36, but may, in an alternative embodiment of the present invention, project from the surface of the retractable panel 36.

As shown in FIG. 3, the access panel 32 is supported on four sides by the secondary panel 30. The access panel 32 pivots upward about the hinge H5 and allows access to the cavity 20. The access panel 32 and the secondary panel 30 enclose the cavity 20, which would otherwise be open when the storable seat cushion 16 is stored and the retractable panel 36 is extended. In this manner, the access panel 32, the secondary panel 30, the structural member 14, the waterfall 24, and the lowered floor pan 26 cooperate as a storage container 58 for smaller cargo.

The access panel 32 extends nearly the entire length of the cavity 20 to increase the accessibility of the storage container 58. To accommodate this extended length of the access panel 32, the upper link 34 contains a rearward-facing notch 60. As best shown in FIG. 4, the upper link 34 folds over the access panel 32 in the retracted position, and rests on the recessed portion 42 of the secondary panel 30 in the extended position.

The retractable panel 36 may include a beveled corner 62, as shown in FIG. 3. The beveled corner 62 of the retractable panel 36 follows the general contours of the structural member 14 in the retracted position. The beveled corner 62 and the structural member 14 are so designed to allow unimpeded egress and ingress of a passenger through a small opening of a vehicle. In a vehicle with a larger opening, the retractable panel 36 may be designed with a sharper corner.

By using the four-bar mechanism 48, the load floor system 10 advances from the retracted position to the extended position. It is anticipated, however, that several possible variations of the four-bar mechanism 48 would accomplish these functions. Two of these variations are described below with similar reference numerals signaling elements with similar physical properties and functional attributes. Further, it is anticipated that commonly known mechanical elements may be used to replace or supplement a portion or the entirety of the four-bar mechanism 48. As an example, a pin-and-track device may replace a bar of the four-bar mechanism 48.

Figure 6:
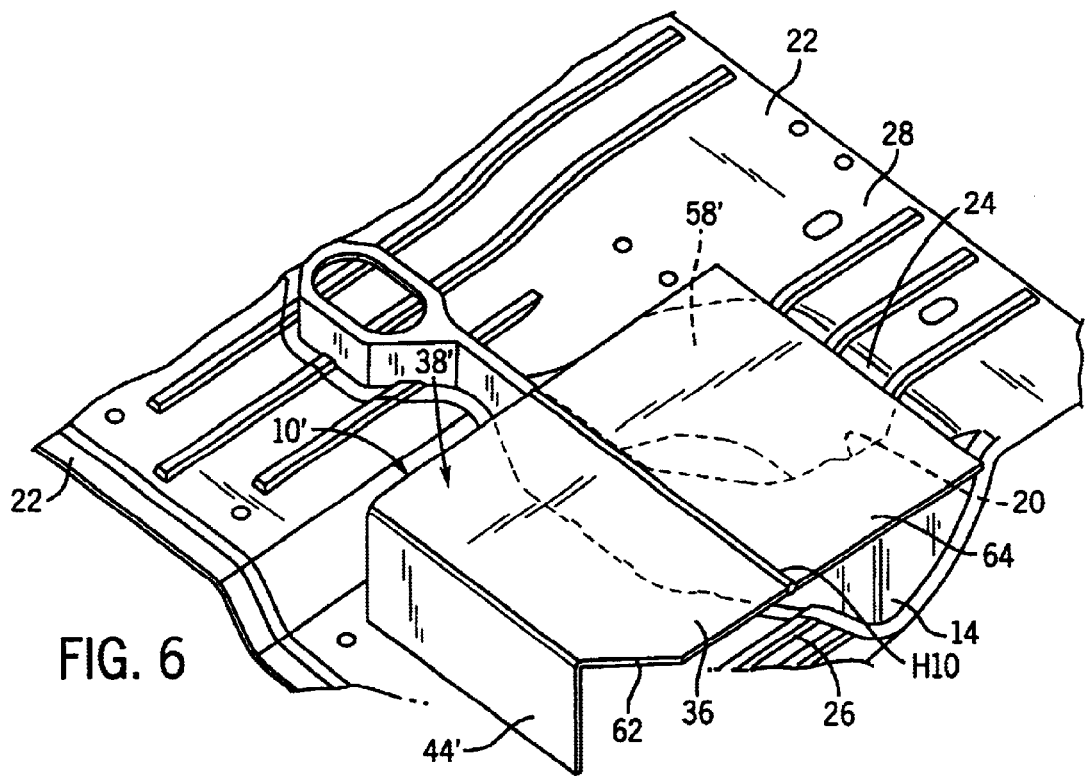
FIG. 6 is a perspective view of a load floor system according to a first alternative embodiment of the present invention, shown in an extended position.

As shown in FIG. 6, a load floor system 10' of a first alternative embodiment of the present invention includes a folding panel 64 and a retractable panel 36'. In the retracted position, the retractable panel 36' abuts the structural member 14 and neatly tucks under the storable seat cushion 16 and rests on a structural bracket 40'. The load floor system 10' is nearly hidden in this position and does not, in any manner, encroach on the leg area or floor space of the vehicle. In the extended position, the folding panel 64 and the retractable panel 36' cooperate to form a load floor 38', as best shown in FIG. 7. The folding panel 64 is supported by the structural bracket 40' at one end and by the connection to the retractable panel 36' at the other end. The retractable panel 36' is supported by the structural member 14 at one end and by a leg panel 44' attached to the retractable panel 36' at the other end. The load floor 38' provides a generally flat surface to secure objects such as toolboxes, machine parts, or other cargo. The load floor 38' may include a tie-down or other devices, such as hooks, clamps, or a hook and loop type fastener, such as VELCRO® strips, which function to secure objects to the floor 38'.

As best shown in FIG. 8, the load floor system 10', like the load floor system 10, incorporates a four-bar mechanism 48' to advance from the retracted position to the extended position. The four-bar mechanism 48' includes (1) a rear link 66, later referenced as a "first link", (2) the retractable panel 36', and (3) a forward link 68, later referenced as a "second link". The structural member, between two fixed points 70 and 72, forms the fourth link of the four-bar mechanism 48'. A hinge H6 pivots the rear link 66 to a rear side of the structural member 14; a hinge H7 pivots the rear link 66 to the retractable panel 36'; a hinge H8 pivots the retractable panel 36' to the forward link 68; and a hinge H9 pivots the forward link 68 to a front side of the structural member 14.

The hinges H6 and H9 are fixed points and are not displaced during the transition from the retracted position to the extended position. The hinges H7 and H8 are movable points and are displaced through arcs A3 and A4, respectively, during the transition. The load floor system 10' further incorporates a hinge H10 between the folding panel 64 and the retractable panel 36' that allows the folding panel 64 to be folded to a rearward position and to form the load floor 38'. The load floor system 10' may include a handle to induce the transition of the load floor system 10' between the retracted position and the extended position.

In its rearward position, the folding panel 64 encloses the cavity 20, which would otherwise be open when the storable seat cushion 16 is stored and the retractable panel 36' is extended. In this manner, the folding panel 64, the structural member 14, the waterfall 24, and the lowered floor pan 26 cooperate as a storage container 58' for smaller cargo. In addition to allowing the folding panel 64 to be folded to a rearward position, the hinge H10 allows the folding panel 64 to be folded to a forward position. In the forward position, the folding panel 64 offers access to the storage container 58'.

Figure 9:
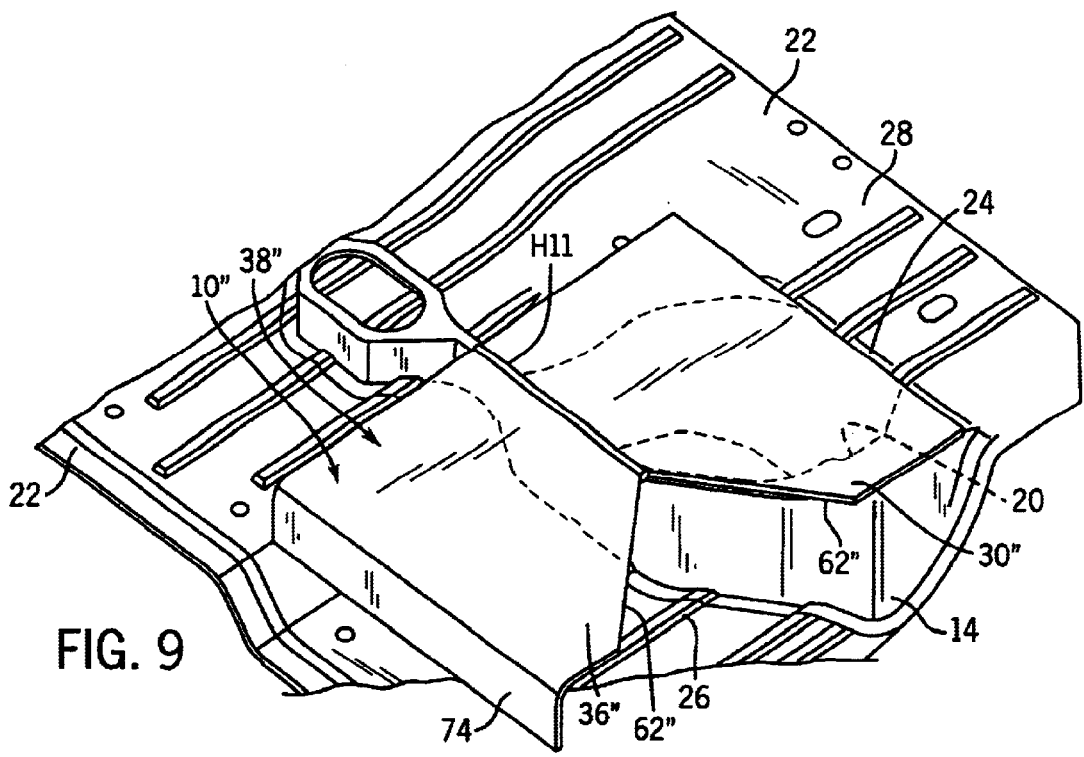
FIG. 9 is a perspective view of a load floor system according to a second alternative embodiment of the present invention, shown in an extended position.
Figure 10:
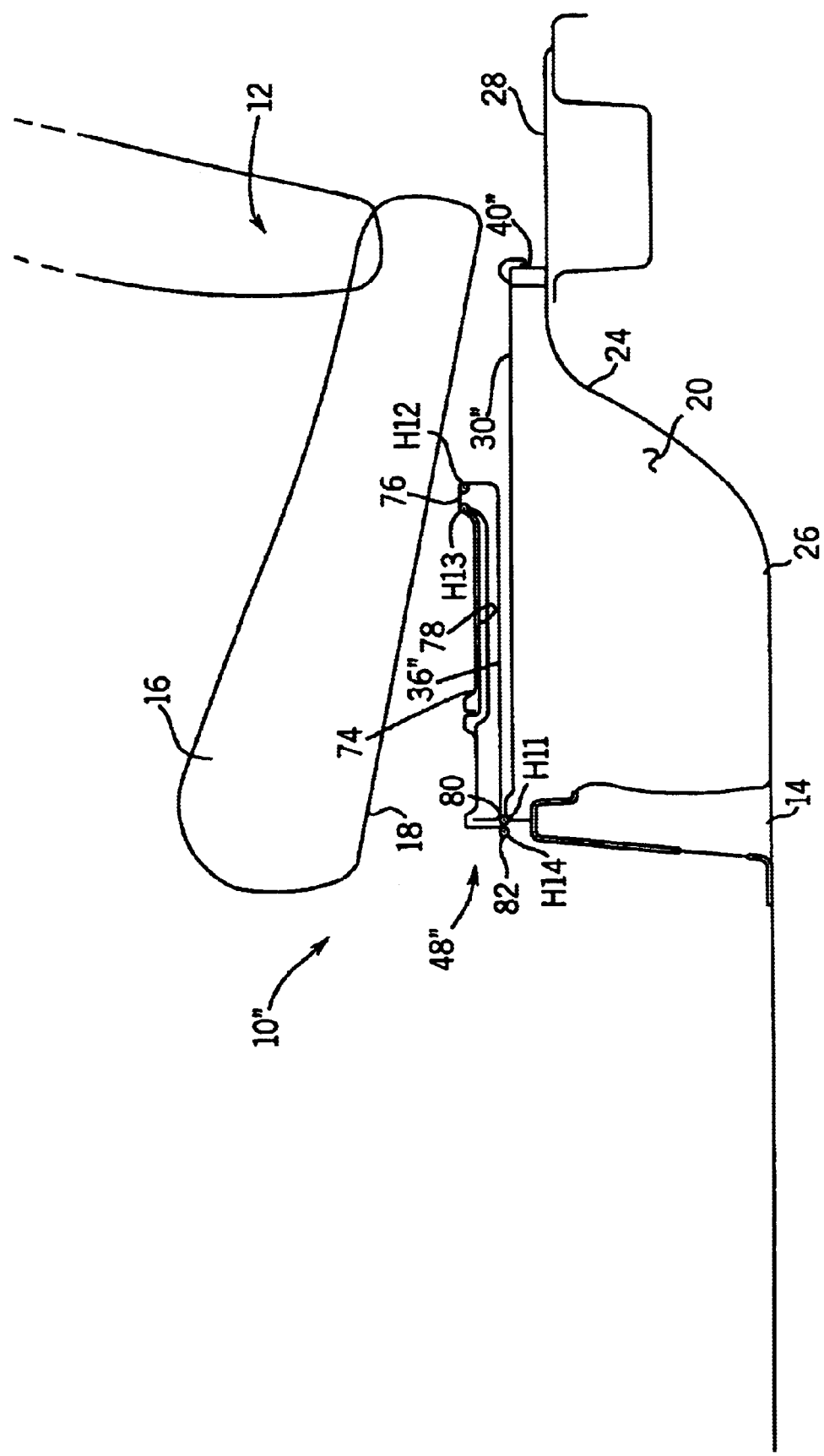
FIG. 10 is a side view of the load floor system of FIG. 9, shown in a retracted position.
Figure 11:
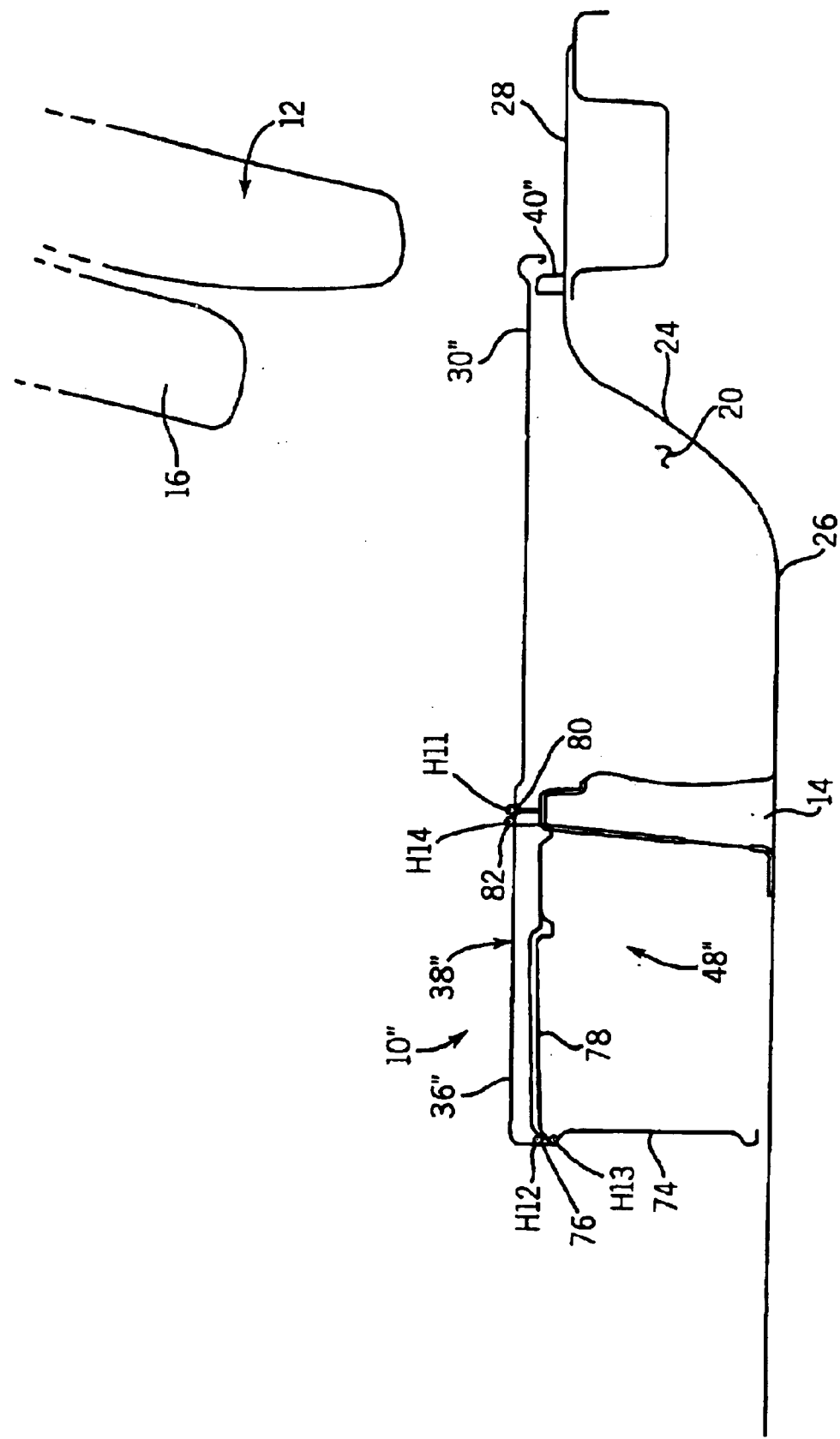
FIG. 11 is a side view of the load floor system of FIGS. 9 and 10, shown in the extended position.

As shown in FIG. 9, a load floor system 10" of a second alternative embodiment of the present invention includes a secondary panel 30" and a retractable panel 36". In the retracted position, the retractable panel 36" neatly tucks under the storable seat cushion 16 on the secondary panel 30", as shown in FIG. 10. The load floor system 10" is nearly hidden in this position and does not encroach on the leg area or floor space of the vehicle. In the extended position, the secondary panel 30" and the retractable panel 36" cooperate to form a load floor 38", as best shown in FIG. 11. The secondary panel 30" is supported at one end by a structural bracket 40" and by the structural member 14 at the other end. The retractable panel 36" is supported by the structural member 14 at one end and by a folding leg 74 at the other end. The load floor 38" provides a generally flat surface to secure objects such as toolboxes, machine parts, or other cargo. The load floor 38" may include a tie-down or other devices, such as hooks, clamps, or VELCRO® strips, which function to secure objects to the load floor 38".

The load floor system 10", like the load floor systems 10 and 10', incorporates a four-bar mechanism 48" to advance the retractable panel 36" and the folding leg 74 from the retracted position to the extended position. The four-bar mechanism 48" includes (1) the retractable panel 36", (2) a short link 76, later referenced as a "second link", (3) a long link 78, later referenced as a "first link", and (4) the distance between two fixed points 80 and 82. A hinge H11 pivotally connects the retractable panel 36" to the secondary panel 30" about a first axis; a hinge H12 pivots the retractable panel 36" to the short link 76; a hinge H13 pivots the short link 76 to the long link 78; and a hinge H14 pivotally connects the long link 78 to the secondary panel 30" about a second axis. The hinges H11 and H14 are fixed points and are not displaced during the transition from the retracted position to the extended position. The hinges H12 and H13 are movable points and are displaced through arcs during the transition. The folding leg 74 is integrally formed with the short link 76 and is automatically extended by the four-bar mechanism 48" to an extended position during the transition of the retractable panel 36" from the retracted position to the extended position. The load floor system 10" may incorporate an access panel to allow access to the cavity 20 to form a storage container, and handle to include the transition of the load floor system 10" between the retracted position and the extended position. Further, the load floor system 10" may be arranged wherein the secondary panel 30" is connected to the structural bracket 40" for movement between an open position to allow access to the cavity 20 under the secondary panel 30" and a closed position.

Both the retractable panel 36" and the secondary panel 30" may include a beveled corner 62", as shown in FIG. 9. The beveled corner 62" of the retractable panel 36" and the secondary panel 30" follow the general contours of the structural member 14 in the retracted position, and form a notch in the extended position. The beveled corner 62" and the structural member 14 are so designed to allow unimpeded egress and ingress of a passenger through a small opening of a vehicle. In a vehicle with a larger opening, the retractable panel 36 may be designed with a sharper corner.

Each of the elements of the load floor systems 10, 10', and 10" may be made from conventional materials and with conventional methods. For example, the secondary panels 30, 30', and 30" and the retractable panels 36, 36', and 36" may be stamped from steel. Other materials, such as plastics, aluminum, and fiber composites, may be used in the interest of weight and cost reduce so long as the structural aspects of the load floor system are maintained.

The above discussion discloses and describes three preferred embodiments of the present invention. It is to be understood that the invention is not limited to the exact construction illustrated and described above, but that various changes may be made if not thereby departing from the scope of the invention as defined in the following claims.

We claim:

1. A load floor system for a vehicle with a seat assembly, a member under the seat assembly, and a floor space adjacent the seat assembly, said load floor system comprising:
   a retractable panel coupled to the structural member;
   a first link coupled to said retractable panel; and
   a second link coupled to said retractable panel;
   such that said retractable panel, said first link, and said second link cooperate as a portion of a four-bar mechanism to translate said retractable panel from a retracted position under the seat assembly to a extended position over the floor space thereby forming a load floor.

2. The load floor system of claim 1 further comprising a leg panel extending from said retractable panel.

3. The load floor system of claim 1 wherein said retractable panel defines a beveled corner to allow unimpeded egress and ingress of a passenger.

4. The load floor system of claim 1 further comprising a secondary panel coupled to said retracted panel and to said structural member, said secondary panel being located under said retractable panel when in the retracted position and adjacent said retractable panel when in the extended position.

5. The load floor system of claim 4 wherein said first link is pivotally connected to said retractable panel, and said second link is pivotally connected to said retractable panel.

6. The load floor system of claim 5 wherein said first link is pivotally connected to said secondary panel and said second link is pivotally connected to said secondary panel, such that said retractable panel, said first link, said secondary panel, and said second link cooperate as the four-bar mechanism.

7. The load floor system of claim 5 wherein said first link is pivotally connectable to the structural member, and said second link is pivotally connectable to the structural member, such that said retractable panel, said first link, the structural member, and said second link cooperate as the four-bar mechanism.

8. The load floor system of claim 7 wherein said first link is pivotally connectable to a front side of the structural member, and said second link is pivotally connectable to a back side of the structural member.

9. The load floor system of claim 4 wherein said retractable panel is pivotally connected to said secondary panel about a first axis, said first link is pivotally connected to the secondary panel about a second axis, said second axis being radially displaced from said first axis, and said second link is pivotally connected to said retractable panel and pivotally connected to said first link, such that said retractable panel, said second link, said first link, and said secondary panel between said first axis and said second axis cooperate as be four-bar mechanism.

10. The load floor system of claim 9 further comprising a leg panel connected to said second link, such that said leg panel nests adjacent said retractable panel in the retracted position and extends from said retractable panel to the vehicle in the extended position.

11. The load floor system of claim 4 further comprising an access panel connected to said secondary panel for movement between an open position to allow access to a space under said secondary panel and a closed position.

12. The load floor system of claim 4 wherein said secondary panel is connected to the vehicle for movement between an open position to allow access to a space under said secondary panel and a closed position.

13. A load floor system for a vehicle with a seat assembly, a structural member under the seat assembly, and a floor space adjacent the seat assembly, said load floor system comprising:
   a secondary panel connectable to the vehicle under the seat assembly;
   a retractable panel pivotally connected to said secondary panel about a first axis;
   a first link pivotally connected to said secondary panel about a second axis, said second axis being radially displaced from said first axis; and
   a second link pivotally connected to said retractable panel and pivotally connected to said first link;
   such that said retracted panel, said second link, said first link, and said secondary panel between said first axis and said second axis cooperate as a floor-bar mechanism to translate said retractable panel from a retracted position over said secondary panel and under said seat assembly to an extended position adjacent said secondary panel and over the floor space thereby forming a load floor.

14. The load floor system of claim 13 wherein further comprising a leg panel connected to said second link, such that said leg panel nests adjacent said retractable panel in the retracted position and extends from said retractable panel to the vehicle in the extended position.

15. The load floor system of claim 13 wherein said retractable panel defines a beveled corner to allow unimpeded egress and ingress of a passenger.

16. The load floor system of claim 13 wherein said secondary panel is connected to the vehicle for movement between an open position to allow access to a space under said secondary panel and a closed position.

17. A load floor system for a vehicle with a seat assembly, a structural member under the seat assembly, and a floor space adjacent the seat assembly, said load floor system comprising;
   a retractable panel coupled to the structural member; and
   a translating means for translating said retractable panel from a retracted position under the seat assembly to an extended position over the floor space thereby forming a load floor.

18. The load floor system of claim 17 further comprising a leg panel extending from said retracted panel.

19. The load floor system of claim 17 wherein said retractable panel defines a beveled corner to allow unimpeded egress and ingress of a passed.

20. The load floor system of 17 further comprising a secondary panel coupled to said retractable panel and to said structural member, said secondary panel being located under said retractable panel when in the retracted position and adjacent said retracted panel when in the extended position.

* * * * *